United States Patent [19]

Cario et al.

[11] Patent Number: 5,744,872
[45] Date of Patent: Apr. 28, 1998

[54] INERTIA RESPONSIVE APPARATUS

[75] Inventors: Gasper Cario, Novi, Mich.; Roger F. Wells, Yorba Linda, Calif.

[73] Assignee: TRW Inc., Lyndhurst, Ohio

[21] Appl. No.: 502,541

[22] Filed: Jul. 14, 1995

[51] Int. Cl.$^6$ .................... B60R 21/32; A62B 35/00; B65H 75/48; H01H 35/14
[52] U.S. Cl. .................... 307/10.1; 242/384; 200/61.52; 250/200; 250/231.1; 280/735; 364/424.055
[58] Field of Search .................... 200/61.45 R–61.45 M; 242/383.2, 384–384.7; 307/9.1, 10.1–10.8, 112–121; 280/727–735, 801.1–808; 250/200, 231.1, 559.01, 559.29; 364/424.055

[56] References Cited

U.S. PATENT DOCUMENTS

| | | | |
|---|---|---|---|
| 1,662,979 | 3/1928 | Nelson | 200/61.52 |
| 3,859,627 | 1/1975 | Quantz | 180/270 |
| 3,927,286 | 12/1975 | Fohl | 200/61.45 R |
| 3,931,764 | 1/1976 | Malisch et al. | 102/206 |
| 3,971,934 | 7/1976 | Coatta et al. | 250/225 |
| 4,001,185 | 1/1977 | Mitsui et al. | 200/61.45 R |
| 4,103,842 | 8/1978 | Martin et al. | 242/384 |
| 4,258,353 | 3/1981 | Carlson | 200/61.45 R X |
| 4,737,630 | 4/1988 | Anderson | 250/231.1 |
| 4,900,925 | 2/1990 | Andres et al. | 73/514.26 X |
| 4,998,684 | 3/1991 | Mori | 242/384.5 |
| 5,013,909 | 5/1991 | Songergeld et al. | 250/231.1 |
| 5,202,831 | 4/1993 | Blacvkburn et al. | 307/10.1 X |
| 5,283,402 | 2/1994 | Green | 200/61.45 R |
| 5,291,014 | 3/1994 | Brede et al. | 250/227.21 |

FOREIGN PATENT DOCUMENTS

| | | | |
|---|---|---|---|
| 0326841 | 8/1989 | European Pat. Off. | |
| 2316977 | 2/1977 | France | |
| 3540948 | 5/1987 | Germany | G01P 15/02 |

*Primary Examiner*—J. R. Scott
*Attorney, Agent, or Firm*—Tarolli, Sundheim, Covell, Tummino & Szabo

[57] ABSTRACT

An apparatus 10 has an inertia assembly 14 which includes a moveable ball 60 for movement from a rest position under the influence of a predetermined change in vehicle inertia. A cap 64 is mounted to engage the ball 60 and to be displaced upon movement of the ball 60 from its rest position. A sensor assembly 16 detects movement of the cap 64. The sensor assembly 16 includes a photodiode 90 which directs a beam of light 92 to impinge upon a phototransistor 96. The cap 64 has a projection member 80 which is moved to interrupt the beam of light 92 when the ball 60 moves from its rest position. In the preferred embodiment, the sensor assembly 16 provides a signal which is used to control activation of a vehicle occupant restraint 18. In the preferred embodiment, the vehicle occupant restraint 18 is a seat belt retractor 18, which has a rotatable spool 134 and ratchet wheels 138. A pawl 142 is engageable with the ratchet wheels 138 to block rotation of the spool 134 when the beam of light 92 is interrupted upon movement from the ball 60 from its rest position, and thereby prevent further withdrawal of a seat belt 140 from the retractor 18. Also in a preferred embodiment, the apparatus is adjustable to vary the amount of the predetermined change in vehicle inertia.

31 Claims, 4 Drawing Sheets

INERTIA RESPONSIVE APPARATUS

BACKGROUND OF THE INVENTION

The present invention relates to an apparatus for sensing changes in a vehicle's inertia. Specifically, the present invention relates to an apparatus which senses a change in a vehicle's inertia caused by a vehicle collision and which activates a vehicle occupant restraint in response to the change in the inertia.

It is known to include an inertia-sensitive mechanism in a seat belt retractor for locking the retractor in the event of a vehicle collision. In one known system the inertia-sensitive mechanism consists of a metal ball that rests in a depression shaped like an inverted cone. A cap resting on the ball is mechanically connected to a retractor lock mechanism. Upon the occurrence of a crash, the ball is dislodged from the depression and rides up the side of the inverted cone. The movement of the ball upsets the cap which triggers the retractor lock. This inertia-sensitive mechanism is an integral part of the retractor and controls only that one retractor. Vehicles now typically include many retractors, hence many inertia-sensitive mechanisms are required. It would be useful if such an inertia-sensitive mechanism could control multiple retractors.

Another prior art device is disclosed in U.S. Pat. No. 3,972,286 to Fohl. This patent discloses an inertia-type switch which has a movable ball which is displaced upon a predetermined change in a vehicle's inertia. The ball is made of electrically conductive material and completes an electrical circuit upon displacement of the ball. Alternatively, the ball moves a mechanical switch or moves a member for causing a change in a magnetic field.

Another prior art device is disclosed in U.S. Pat. No. 4,737,630 to Anderson. In this device, a beam of radiation is passed through a hole in a inertia body. The inertia body is shaped as a truncated cone with a thin cylindrical foot. The body is tipped upon a predetermined change in vehicle inertia such that the light beam is not aligned with the hole.

SUMMARY OF THE INVENTION

The present invention is directed to an apparatus which includes an inertia assembly for reacting to a predetermined change in vehicle inertia. The inertia assembly is a compact, simple mechanical system which generates an electrical signal upon the occurrence of a crash. The electrical signal may be used to control the locking of multiple retractors in a vehicle.

The inertia assembly includes a movable ball for moving from a rest position under the influence of the predetermined change in vehicle inertia. A displaceable member engages the ball. A means mounts the displaceable member for movement relative to the ball when the ball moves from its rest position. A sensor assembly detects movement of the displaceable member. The sensor assembly includes a means for directing a beam of radiation and a means for receiving the beam of radiation. The displaceable member includes a portion for interrupting the beam of radiation when the ball moves from its rest position. An electrical locking signal is generated by the beam receiving means.

Preferably, the apparatus also includes a vehicle occupant restraint which is activated in response to the predetermined change in vehicle inertia. In the preferred embodiment, the vehicle occupant restraint includes a spool for storing a seat belt wound on the spool. The spool is rotatable about an axis in belt withdrawal and belt retraction directions. A ratchet wheel is fixed for rotation with the spool. A movable pawl means has a blocking position for blocking the ratchet wheel and the spool against rotation in the belt withdrawal direction and a release position for permitting rotation of the ratchet wheel and the spool in the belt withdrawal direction.

An activator means moves the pawl means from its release position to its blocking position. A control means controls the actuator means. The sensor assembly provides a signal to the control means which is indicative of the movement of the displaceable member. The control means controls the actuator means in response to a change in the signal from the sensor means.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT

Figure 1:
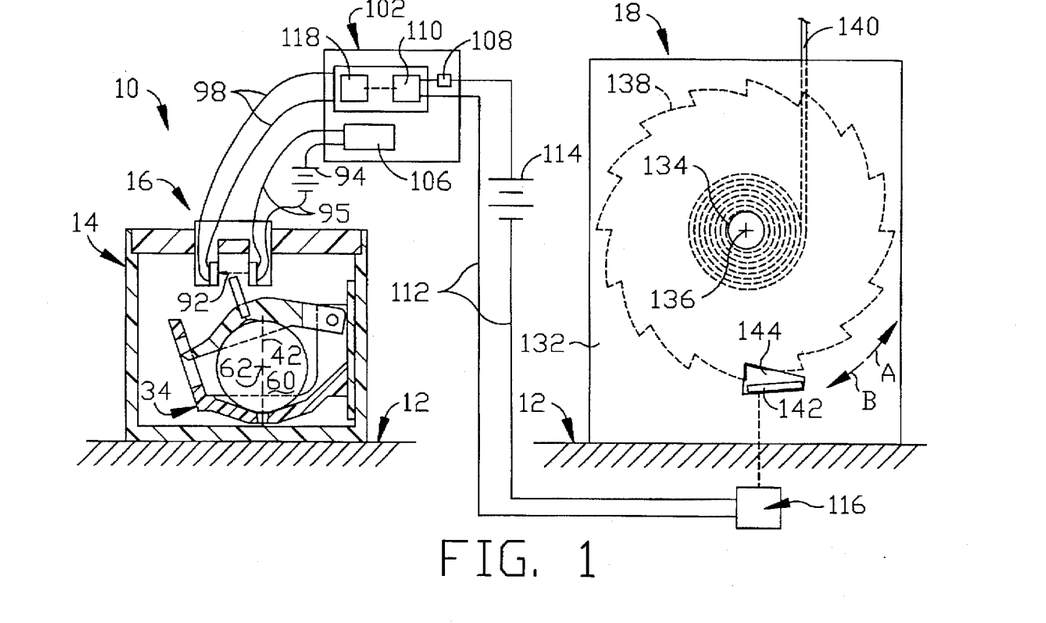
FIG. 1 is a schematic representation of an apparatus according to the present invention, with certain parts in a first operational position.

An apparatus 10 according to the present invention is schematically illustrated in FIG. 1 as being located in a vehicle 12. The apparatus 10 includes an inertia assembly 14 which has parts for reacting to vehicle inertia changes, a sensor assembly 16 which has parts for detecting an inertia reaction in the inertia assembly 14 and a vehicle occupant restraint 18 which is activated in response to a predetermined change in vehicle inertia. The inertia assembly responds to a change in acceleration/deceleration of the vehicle 12 in any of several directions, including forward, rearward, lateral and tip-over directions, which may occur in a vehicle collision. These several types of changes in acceleration/deceleration are referenced herein collectively as changes in vehicle inertia.

The inertia assembly 14 (FIG. 2) includes a protective plastic housing 30 which is fixed to a portion of the vehicle 12. The housing 30 includes a lid 32 for enclosing an interior of the housing 30 and for protecting the contents located within the housing 30. Inside the housing 30 is a plastic support member 34.

Figure 2:
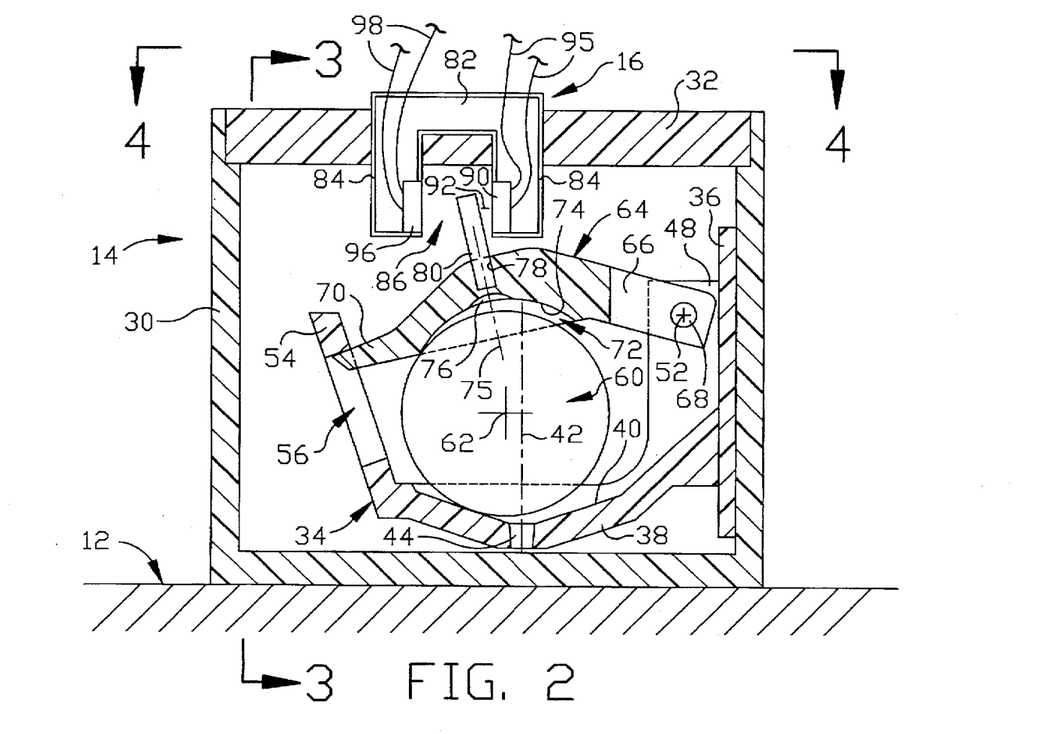
FIG. 2 is enlarged sectional view of a portion of the apparatus shown in FIG. 1, with certain parts in a second operational position.

A flat, plate-like mount portion 36 of the support member 34 is attached to an inner sidewall of the housing 30 by means of adhesive or fasteners. A cup portion 38 of the support member 34 extends from the mount portion 36 adjacent a bottom wall of the housing 30. The cup portion 38 has an upward facing surface 40 which extends symmetrically about a vertical center axis 42. The surface 40 tapers radially inward toward the center axis 42 as the surface 40 extends downward. Thus, the tapered surface 40 defines a tapered recess having an upward facing concavity. The tapered surface 40 may be shaped such that the concavity is either conical, ellipsoidal, or semispherical. The tapered surface 40 has a lowest portion at which is located a vent hole 44. The vent hole 44 extends through the cup portion 38 to the atmosphere within the housing 30.

Two upright portions 48 (see FIG. 3, in which the lid 32 has been removed) of the support member 34 extend vertically along the mount portion 36 and project outwardly from the mount portion 36. The upright portions 48 are spaced a distance apart, and are located adjacent and above respective sides of the cup portion 38. Each mount portion 48 has a bore 50 which extends horizontally through an upper segment of the respective mount portion 48. These bores 50 are aligned along a horizontal axis 52.

Figure 3:
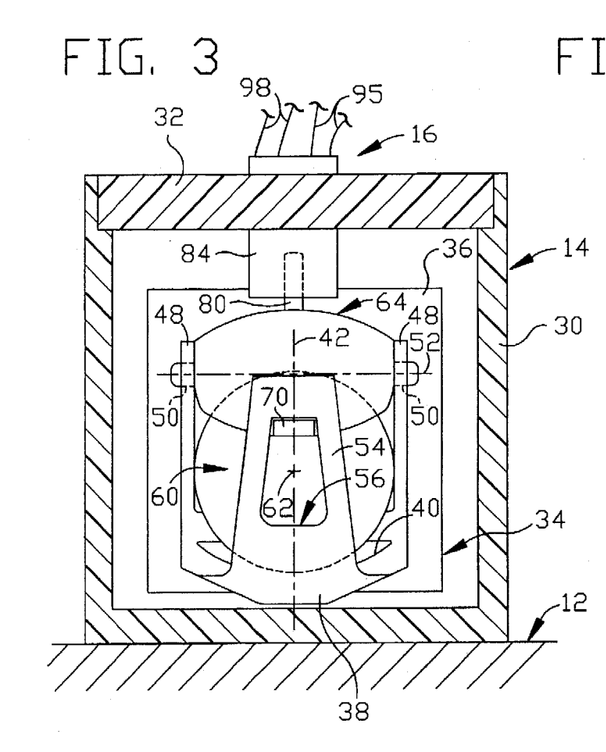
FIG. 3 is a sectional view taken along lines 3—3 in FIG. 2.
Figure 4:
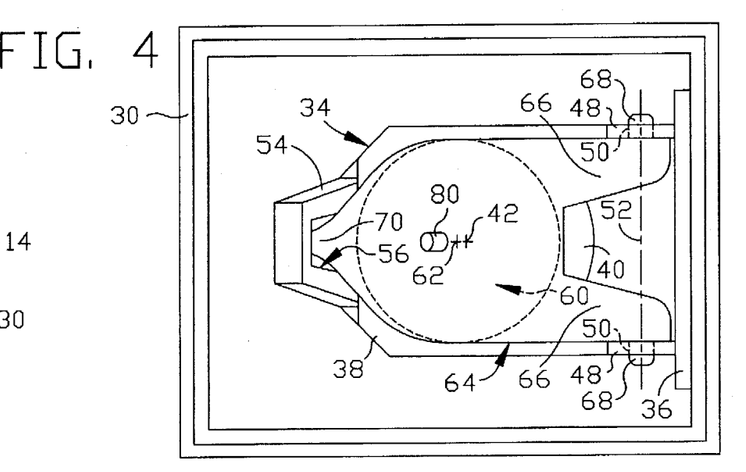
FIG. 4 is a view taken along line 4—4 in FIG. 2, with certain parts removed for clarity.

A lip portion 54 (FIG. 4) of the support member 34 extends upward from the cup portion 38 at a side of the cup portion 38 opposite the mount portion 36 and the upright portions 48. An upper end of the lip portion 54 is at approximately the same height as the horizontal axis 52 (FIG. 3). The lip portion 54 has a vertically elongate slot 56 which extends along most of the length of the lip portion 54 and which extends through the lip portion 54. An inertia ball 60 is located on the cup portion 38 of the support member 34. The ball 60 is made of a relatively high density material, such as steel, and has a center of mass 62. The ball 60 has a rest position (FIG. 1) at the lowest portion of the cup portion 38 due to the tapered surface 40. When the ball 60 is in this rest position, the center of mass 62 is aligned with the center axis 42 of the tapered surface The ball 60 has a radius which is sized to promote rolling movement of the ball 60 on the cup portion 38 of the support member 34. The ball 60 is omni directional, in that it can roll in any radial direction from the center axis 42 along the tapered surface 40. Changes in the inertia of the vehicle 12 tend to cause the ball 60 to roll relative to the cup portion 38 from the rest position. In the preferred embodiment, the ball 60 and the tapered surface 40 are dimensioned such that the ball 50 only rolls from the rest position in response to a change in vehicle inertia produced by an acceleration/deceleration greater than an amount of 0.6g.

When the ball 60 rolls from the rest position, the ball 60 rolls radially outward (FIGS. 2 and 4) from the center axis 42 and also rolls upward (FIG. 2) along the tapered surface 40. The center of mass 62 is moved away from the center axis 42. The center of mass 62 is also displaced upward.

The vent hole 44 through the cup portion 38 allows an air flow through the cup portion 38 to prevent a vacuum from being created between the ball 60 and the cup portion 38 such that movement of the ball 60 is not inhibited. Once the change in the inertia of the vehicle 12 is dissipated, the ball 60 rolls downward and radially inward toward its rest position (FIG. 1) at the lowest portion of the cup portion 38. Again, at this rest position, the center of mass 62 is aligned with the center axis 42.

The inertia assembly 14 includes a plastic cap 64 (FIG. 2) which is located above the ball 60. The cap 64 has two latitudinally extending heel portions 66 (FIG. 4) which extend into the space between the two upright portions 48 of the support member 34. Each heel portion 66 has a segment located adjacent to the portion of a respective upright portion 48 containing the bore 50. Two pivot pins 68 mount the cap 64 to the upright portions 48 for pivotal movement about the axis 52. Each pivot pin 68 extends through the respective bore 50 and to the respective heel portion 66.

A tip portion 70 of the cap 64 is located at a distal end of the cap 64 from the heel portions 48. The tip portions 70 extends into the vertical slot 56 of the support member 34. The tip portion 70 is constrained to move only within the vertical range defined by the vertical slot 56. Thus, the cap 64 can only pivot until the tip portion 70 abuts the support member 34 at the upper end of the vertical slot 56. When the cap 64 is mounted to the support member 34 by the pivot pins 68, the support member 34 and the cap 64 trap the ball 60 between them and constrain the movement of the ball 60 to roll only along the tapered surface 40 of the cup portion 38.

In the preferred embodiment, the cap 64 includes a tapered recess having a downward facing concavity 72 (FIG. 2) located intermediate the heel portions 66 and the tip portion 70. The concavity 72 is defined by a tapered surface 74 which symmetrically extends about an axis 75. The tapered surface 74 may be shaped such that the concavity 72 is either conical, ellipsoidal, or semi-spherical.

In the preferred embodiment, the concavity 72 is semi-spherical and the tapered surface 74 lies at a radius from a center point which is approximately equal to the radius of the ball 60. Also, the axis 75 is at an angle relative to the axis 42. Located at the most recessed end of the concavity 72, at the axis 75, is a dimple 76.

The ball 60 partially extends into the concavity 72. When the ball 60 is in its rest position, the ball 60 is seated against a most recessed segment of the tapered surface 74. During movement of the ball 60 along the tapered surface 40 of the cup portion 38 of the support member 34, the ball 60 also moves along the tapered surface 74 of the cap 64.

During movement of the ball 60, the cap 64 is pivoted about the axis 52 and displaced upward because the ball 60 is moved upward along the tapered surface 40, and moreover, the cap 64 is cammed upward as the ball 60 moves along its tapered surface 74. The dimple 76 holds a pocket of air to help prevent a vacuum from being created between the tapered surface 74 and the ball 60 so that relative movement between the ball 60 and the cup 64 is not inhibited. Also, the ball 60 can move away from the tapered surface 40 and pivot the cap 64 upon the occurrence of a vehicle roll-over because of the force of gravity on the ball 60.

A bore 78 extends in the cap 64 above the concavity 72 along the axis 75. A projection member 80 is fixed into the bore 78 such that the projection member 80 extends upward above a top of the cap 64 along the axis 75. The projection member 80 may be attached to the cap 64 by any suitable means, such as adhesive or mating threads on the projection member 80 and the cup 64.

The projection member 80 is made of optically opaque material. This projection member 80 defines a projection which extends above the cap 64. In the alternative, a projection may be formed as one piece with the cap 64. The projection member 80 is moved upward during pivoting of the cap 64 about the axis 52 caused by the ball 60 moving from the rest position.

The sensor assembly 16 of the apparatus 10 is mounted in the lid 32 of the housing 30. The sensor assembly 16 includes a generally "U"-shaped bracket 82 which has two downwardly extending arms 84. The arms 84 extend into the interior defined by the housing 30. The arms 84 are spaced across an air gap 86 in the interior of the housing 30.

The sensor assembly 16 and the inertia assembly 14 are positioned such that when the ball 60 is at its rest position (FIG. 1) the top of the projection member 80 is located below, or just barely within, the gap 86. Moreover, during movement of the ball 60 in response to the predetermined amount of change in the vehicle inertia, the projection member 80 is moved a relatively considerable distance into the gap 86.

Figure 5:
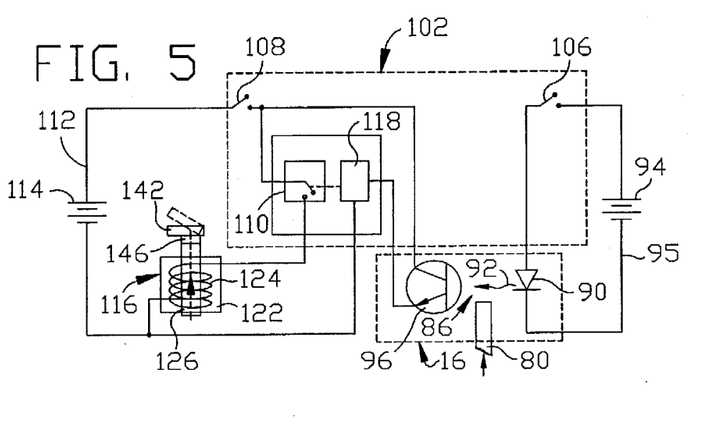
FIG. 5 is a schematic circuit diagram for the apparatus shown in FIG. 1.

A photodiode 90 (FIG. 2) of the sensor assembly 16 is mounted in or on one of the arms 84. The photodiode 90 is powered by an electrical power source 94 (FIG. 5). The power source 94 is connected to the photodiode 90 via electrical connection lines 95. The photodiode 90 directs a radiation beam of light 92 (FIG. 1) across the gap 86 toward the other arm 84. It is to be understood that a photodiode is Used in the preferred embodiment, however, other means of directing a beam of radiation 92 across the gap 86 may be used. The width of the beam of light 92 is less than the width of the projection member 80.

A phototransistor 96 (FIG. 2) is located in or on the other arm 84 for receiving the beam of light 92 directed across the gap 86 from the photodiode 90. It is to be understood that a phototransistor is used in the preferred embodiment, however, other means for receiving a beam of radiation 92 may be used. When the projection member 80 is moved into, or further into, the gap 86 because of the movement of the ball 60 under the influence of the predetermined change in vehicle inertia, the projection member 80 blocks and interrupts the beam of light 92 from the photodiode 90 (as shown in FIG. 2). Thus, the beam of light 92 does not impinge upon the phototransistor 96. The position of the projection member 80 in which it blocks the beam of light 92 preferably occurs at the time that the lip portion 70 abuts against the support member 34 at the upper end of the vertical slot 56.

The phototransistor 96 provides an electrical voltage signal which varies in response to an intensity of light which impinges upon the phototransistor 96. Thus, when the beam of light 92 is interrupted by the projection member 80, a change in the electrical signal from the phototransistor 96 occurs. Electrical connection lines 98 are connected to the phototransistor 96 for carrying the voltage signal from phototransistor 96 to a control device 102 (FIGS. 1 and 5) of the apparatus 10. The control device 102 includes a switch 106 which is attached to the connection lines 95 for closing a circuit to deliver electrical energy to the photodiode 90 to initiate operation of the apparatus 10. The control device 102 also includes a disabling switch 108 on an electrical circuit along connection lines 112. The switches 106 and 108 are closed during operation of the vehicle. For example, closing of the switches 106 and 108 may be associated with closing of a vehicle entry door (not shown) and/or activation of a vehicle ignition switch (not shown). The connection lines 112 interconnect a power source 114 and an activator device 116 for the vehicle occupant restraint, such that electrical energy from the power source 114 can be delivered to the activator device 116.

The connection lines 95, 98 and 112 can be any length. This permits placement of the inertia assembly 14/sensor assembly 18, the control device 102 and the activator device 116/vehicle occupant restraint 18 at locations which are remote from each other. Thus, the inertia assembly 14/sensor assembly 16 can be mounted to a part of the vehicle 12 which is spaced away from the part of the vehicle 12 to which the vehicle occupant restraint 18 is mounted.

A switch 110 is also connected to the connection lines 112. The operation of the switch 110 is controlled by a signal responsive switching device 118 of the control device 102. The signal responsive switching device 118 is connected to the connection lines 98 for receiving the electrical signal from the phototransistor 96.

When a predetermined change in the electrical signal from the phototransistor 96 occurs because of the interruption of the beam of light 92 by the projection member 80, the signal responsive switching device 118 closes the switch 110. Closing the switch 110 energizes the activator device 116. The activator device 116 causes activation of the vehicle occupant restraint 18 (FIG. 1) which restrains a vehicle occupant (not shown).

The activator device 116 can be of various forms, such as an electrical or an electro-mechanical device. As illustrative of the present invention, a schematic representation of the activator device 116 of a preferred embodiment is shown in FIG. 1. In the preferred embodiment, the activator device 116 includes an electromagnet 122 (FIG. 5) which has one or more wire coils 124 wound about a core 126 which is preferably ferrous. The electromagnet 122 is de-energized until both the switch 108 and the switch 110 are closed. Thus, the electromagnet 122 is energized when the beam of light 92 is interrupted by the projection member 80 and the signal responsive switching device 118 closes the switch 110.

The vehicle occupant restraint 18 can be of various forms, such as a seat belt webbing restraint device or an inflatable restraint device. Again, as illustrative of the present invention, in the preferred embodiment schematically shown in FIG. 1, the vehicle occupant restraint 18 is represented as a seat belt webbing retractor.

The retractor 18 has a metal frame 132, which is adapted to be fixed to a portion of the vehicle 12 and a seat belt storage spool 134, which is rotatable about an axis 136 relative to the frame 132. Two metal locking ratchet wheels 138 (only one shown) are fixed for rotation with the spool 134. A length of seat belt 140 is wound on the spool 134. An end of the seat belt 140 is attached to the spool 134, in a known manner.

The spool 134 and the ratchet wheels 138 are rotatable in a seat belt withdrawal (unwinding) direction A and in a seat belt retraction (winding) direction B. A rewind spring (not shown) acts between the frame 132 and the spool 134 to bias the spool 134 to rotate in the seat belt retraction direction B, as is known.

A metal locking pawl 142 is pivotably supported in openings 144 (only one shown) formed in the frame 132. The pawl 142 has portions which are adjacent to the ratchet wheels 138 and which are movable into engagement with the ratchet wheels 138 upon pivoting of the pawl 142 to a blocking position from a release position. In the blocking position, the pawl 142 blocks rotation of the ratchet wheels 138 and the spool 134 in the seat belt withdrawal direction A. Thus, further withdrawal of the seat belt 140 is prevented and the vehicle occupant is restrained.

A permanent magnet 146 (FIG. 5) is attached to the pawl 142 for causing movement with the pawl 142. The permanent magnet 146 is fixed to the pawl 142 in a suitable manner, such as by an adhesive bond. The permanent magnet 146 is preferably made of a relatively light material, such as ceramic, to minimize the pivoting mass of the pawl 142.

The activator device 116 is located adjacent to the pawl 142 and the attached permanent magnet 146 for causing pivoting of the pawl 142 from its rest position to its blocking position. When the electromagnet 122 of the activator device 116 is de-energized, the permanent magnet is magnetically attracted to the core 126 which biases the pawl 142 toward its rest position. Upon energization of the electromagnet 122, the magnetic polarity at the end of the core 126 adjacent the permanent magnet 146 repels the permanent magnet. When the core 126 repels the permanent magnet 146, the pawl 142 is pivoted to its blocking position such that the ratchet wheels 138 and the spool 134 are prevented from rotating in the belt withdrawal direction A.

In operation, the switches 106 and 108 are closed upon initiation of the use of the vehicle by the vehicle operator. For example, closing the door of the vehicle and/or activation of the vehicle ignition switch. Prior to the occurrence of a change of the vehicle inertia above a predetermined amount, the ball 60 is in its rest position. The ball 60 engages the lowest portion of the tapered surface 40 and also engages the most recessed segment of the tapered surface 74. The tip portion 70 of the cap 64 is located downward, away from the upper extent of the vertical slot 56.

The projection member 80 is located below the light beam 92 such that the light beam 92 is not interrupted. The voltage signal provided by the phototransistor 96 is such that the switch 110 is kept open. The activator device 116 is de-energized and the pawl 142 is in its release position. Thus, the webbing 140 may be withdrawn from the retractor 18.

Upon the occurrence of a change in the vehicle inertia above the predetermined amount, the ball 60 is moved from its rest position outward and upward along the tapered surface 40. Further, the ball is moved relative to the cap 64 along the tapered surface 74. Thus, the cap 64 is pivoted upward, and the projection member 80 is moved upward into the beam of light 92.

The beam of light 92 is interrupted, which causes a change in the electrical signal provided by the phototransistor 96 to the signal responsive switching device 118. The signal responsive switching device 118 thus closes the switch 110. The switch 110, when closed, energizes the activator device 116 which causes the permanent magnet 146 to be biased away from the electromagnet 122. Thus, the pawl 142 is pivoted upward into its blocking position, and rotation of the rachet wheels 138 and the spool 134 in the belt withdrawal direction A is prevented and withdrawal of the seat belt 140 from the retractor 18 is prevented.

Figure 6:
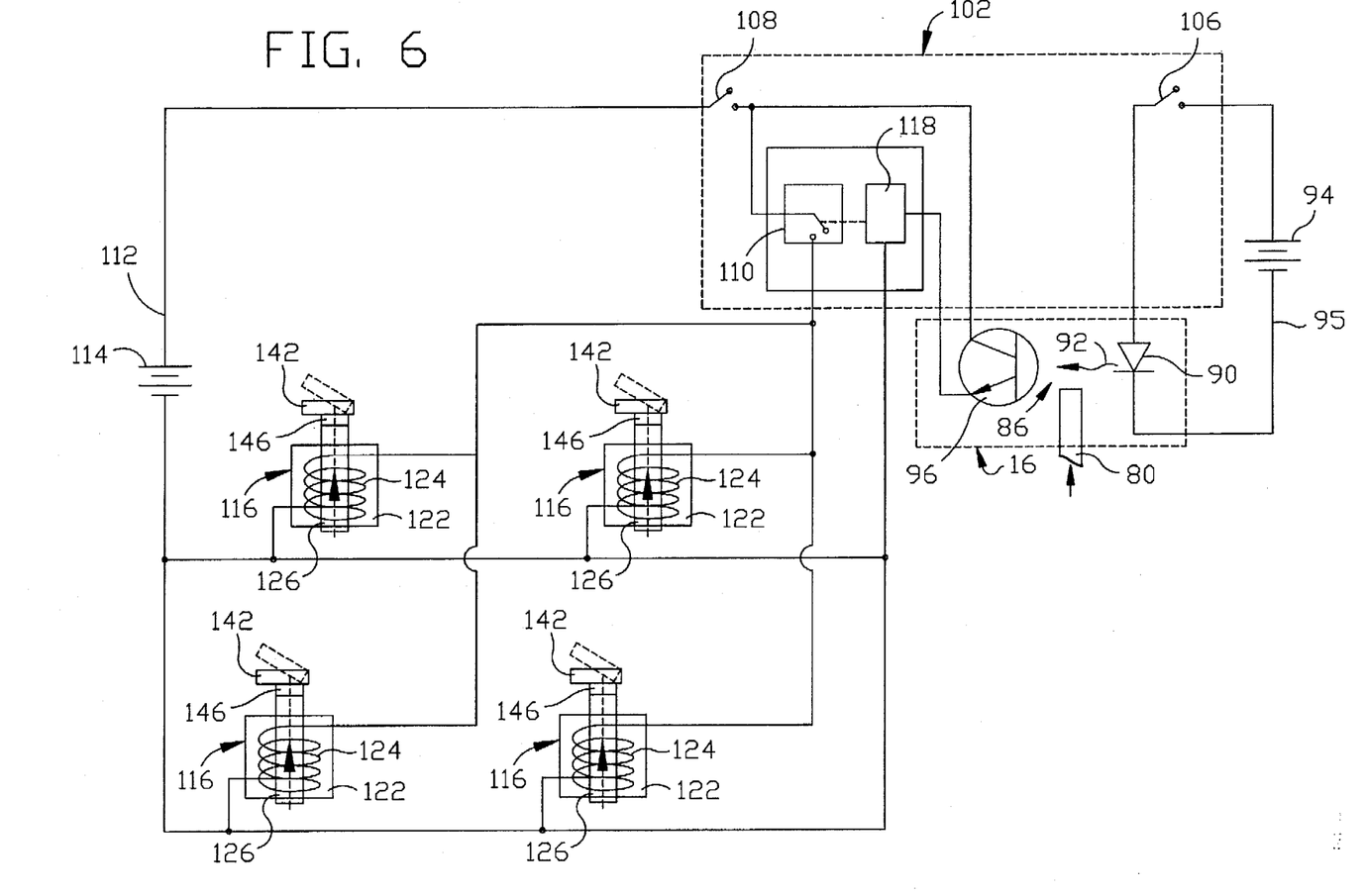
FIG. 6 is a schematic circuit diagram of another embodiment.

In a second embodiment of the present invention, a single inertia assembly 14/sensor assembly 16 is used to control multiple activation devices 116 for respective multiple vehicle occupant restraints 18. The second embodiment is schematically illustrated in FIG. 6 and has structural elements which are identified by reference numerals which are identical to the reference numerals used for the first embodiment. In the second embodiment, a plurality (four) of activator devices 116 are connected to, and controlled by, the single switch 110. When the switch 110 is closed, all of the activator devices 116 are energized.

In a third embodiment of the present invention (FIGS. 7 and 8), a modified sensor assembly 16' is provided. In the third embodiment, other structural elements which are identical to structural elements of the first embodiment are identified by identical reference numbers. It is to be understood that the previous description of these structural elements is applicable to the third embodiment.

The modified sensor assembly 16' has a photodiode 160 mounted in or on one of the arms 84. The photodiode 160 is powered by the electrical source 94 (not shown in FIGS. 7 and 8), via electrical connection lines 95. The photodiode 160 directs light radiation 162 across the gap 86 toward the other arm 84. It is to be understood that a photodiode is preferably used, however, other means for directing radiation 162 across the gap 86 may be used.

Figure 7:
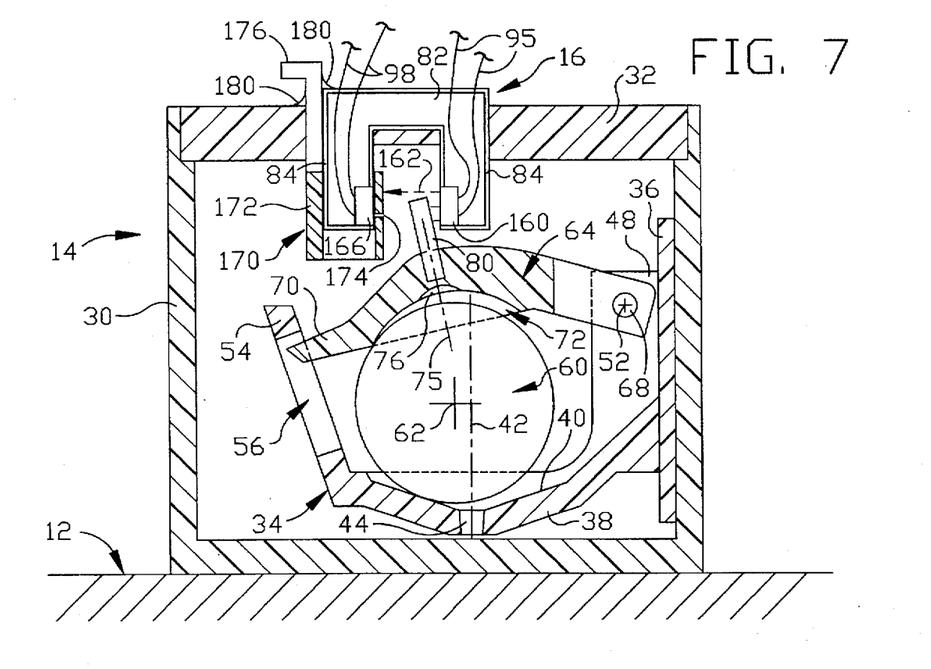
FIG. 7 is a sectional view of a portion of another embodiment showing operation with certain parts in a first adjusted position.
Figure 8:
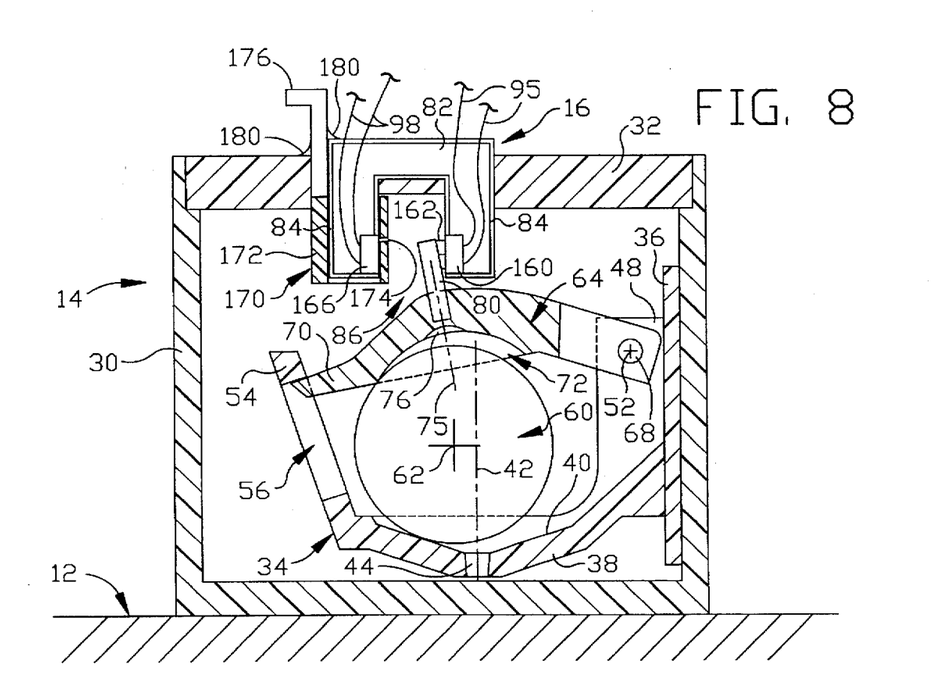
FIG. 8 is a view similar to FIG. 7 showing operation with certain parts in a second adjusted position.

A phototransistor 166 is located in or on the other arm 84 for receiving the light radiation 162 directed across the gap 86 from the photodiode 160. It is to be understood that a phototransistor is preferably used, however, other means for receiving radiation 162 may be used. The light radiation 162 from the photodiode 160 has a beam width or is divergent such that at the location of the phototransistor 166, the light radiation 162 impinges an area which is approximately equal to, or greater than, the size area of the phototransistor 166. During movement of the projection member 80 into the gap 86, the projection member 80 may block only a portion of the light radiation 162 which would otherwise impinge upon the location of the phototransistor 166.

A movable shielding mask 170 is disposed adjacent to the arm 84 associated with the phototransistor 166 and is a means for controlling radiation impingement on the phototransistor. The shield mask 170 includes a tube-shape shroud portion 172 which encircles the arm 84 and has a configuration congruent with the arm 84. An aperture 174 through the shroud portion 172 is located adjacent to the phototransistor 166 and allows a portion of the light radiation 162 to impinge upon the phototransistor 166.

The shield mask 170 is vertically adjustable by a handle 176 which extends through the lid 32 adjacent to the bracket 82. Upward and downward movement of the handle 176 corresponds to upward and downward movement of the shroud portion 172 and its aperture 174 along the phototransistor 166. This vertical movement of the aperture 174 adjusts the height at which a portion of the light radiation 162 impinges upon the phototransistor 166. This adjusts the location at which the upward movement of the projection member 80 is detected by the sensor assembly 16'.

At each particular height of the aperture 174, the projection member 80 must be moved a particular amount into the gap 86 before the light radiation 160 is blocked from entering the aperture 174 and impinging upon the phototransistor 166. Thus, the ball 60 and the cap 64 must move predetermined amounts before the projection member 80 blocks the light radiation 160.

The amount of movement of the ball 60 and the cap 64 are proportional to the amount of the change in vehicle inertia. For example, a relatively small change in vehicle inertia causes the ball 60 to move along the tapered surface 40 a first amount (FIG. 7) and a relatively large change in vehicle inertia causes the ball 60 to move a second, greater amount. Accordingly, the cap 64 is pivoted upward a larger amount for a larger movement of the ball 60.

Adjusting the height of the aperture 174 adjusts the minimum level of inertia change necessary to cause blocking of the light radiation 162 against entering the aperture 174. As shown in FIG. 7, the shield mask 170 is in a relatively low position and the aperture 174 is relatively low on the phototransistor 166. Thus, the light radiation 162 is blocked from the aperture 174 after only a relatively small amount of movement of the ball 60 caused by a relatively small change in vehicle inertia. The sensor assembly 16' provides the signal to the control device 102 (Rot shown in FIGS. 7 and 8) to cause the vehicle occupant restraint 18 (not shown in FIGS. 7 and 8) to activate.

The projection member 80 need not block all of the light radiation 162, only the portion which would enter the aperture 174. The other portions of the light radiation 162 are already blocked by the shroud portion 172. Also, the projection member 80 can move upward to block more of the light radiation 162 than necessary, as would be the case for changes in vehicle inertia greater than the required minimum.

As shown in FIG. 8, the shield mask 170 is in a relatively high position and the aperture 174 is relatively high on the phototransistor 166. Thus, the light radiation 162 is blocked from the aperture 174 after a relatively large amount of movement of the ball 60 caused by the relatively large change in vehicle inertia.

The adjustment of the shield mask 170 permits use in various styles and models of vehicles and use under various designated vehicle conditions. As an example, the range of adjustment of the shield mask 170 corresponds to a range of minimum required vehicle inertia change of about 0.5g–2.0g. Once the shield mask 170 is adjusted, the shield mask 170 is fixed in place relative to the bracket 82 and the lid 32. Any suitable fastener means may be used; as an example a cured adhesive 180 is shown in the Figures.

From the above description of the invention, those skilled in the art will perceive improvements, changes and modifications. For example, a delay timer may be used to hold the switch 110 closed for a predetermined time period after the switch 110 is initially closed. Such improvements, changes and modifications within the skill of the art are intended to be covered by the appended claims.

Having described the invention, the following is claimed:

1. An apparatus for helping to protect a vehicle occupant, said apparatus comprising:

an inertia assembly for reacting to a vehicle inertia change, said inertia assembly including a movable ball for moving from a rest position under the influence of a predetermined change in vehicle inertia, a displaceable member engaging said ball, and means for mounting said displaceable member for movement relative to said ball when said ball moves from its rest position; and a sensor assembly for detecting movement of said displaceable member, said sensor assembly including means for directing a beam of radiation and means for receiving the beam of radiation;

said displaceable member including a portion for interrupting the beam of radiation when said ball moves from its rest position, said displaceable member extending above said ball and being moved upward when said ball moves from its rest position, said displaceable member having a tapered recess in which a portion of said ball is located when said ball is in its rest position, said ball being movable relative to said displaceable member and along said tapered recess for moving said displaceable member upward as said ball moves from its rest position.

2. An apparatus for helping to protect a vehicle occupant, said apparatus comprising:

an inertia assembly for reacting to a vehicle inertia change, said inertia assembly including a movable ball for moving from a rest position under the influence of a predetermined change in vehicle inertia, a displaceable member engaging said ball, and means for mounting said displaceable member for movement relative to said ball when said ball moves from its rest position;

a sensor assembly for detecting movement of said displaceable member, said sensor assembly including means for directing a beam of radiation and means for receiving the beam of radiation, said displaceable member including a portion for interrupting the beam of radiation when said ball moves from its rest position;

a plurality of vehicle occupant restraints;

a plurality of activator means for activating said plurality of vehicle occupant restraints; and a single control means for controlling said plurality of activator means in response to a signal from said sensor assembly which is indicative or said ball rolling from its rest position.

3. An apparatus for helping to protect a vehicle occupant, said apparatus comprising:

an inertia assembly for reacting to a vehicle inertia change, said inertia assembly including a movable ball for moving from a rest position under the influence of a predetermined change in vehicle inertia, a displaceable member engaging said ball, and means for mounting said displaceable member for movement relative to said ball when said ball moves from its rest position;

a sensor assembly for detecting movement of said displaceable member, said sensor assembly including means for directing a beam of radiation and means for receiving the beam of radiation, said displaceable member including a portion for interrupting the beam of radiation when said ball moves from its rest position; and adjustment means for adjusting a point at which said sensor assembly detects movement of said displaceable member to vary the amount of the predetermined change in vehicle inertia.

4. An apparatus as set forth in claim 3, wherein said sensor assembly includes an arm for supporting said means for receiving the beam of radiation, said adjustment means includes a mask which covers a portion of said arm and said means for receiving the beam of radiation, said mask having an aperture for permitting passage of only a portion of the beam of radiation to impinge upon said means for receiving the beam of radiation.

5. An apparatus as set forth in claim 4, wherein said adjustment means includes means for varying the position of said mask relative to said arm and relative to said means for receiving the beam of radiation to vary the portion of the beam of radiation which is permitted to pass through said aperture.

6. An apparatus as set forth in claim 5, wherein said mask is movable relative to said arm and relative to said means for receiving the beam of radiation, said mask is movable in directions relatively toward and away from said inertia assembly, changing the position of said mask relative to said arm and relative to said means for receiving the beam of radiation changes the amount of movement of said displaceable member needed to cause interruption of the portion of the beam of radiation which would otherwise be permitted to pass through said aperture.

7. An apparatus as set forth in claim 6, further including a housing supporting said inertia assembly and said sensor assembly, said mask having a portion extending through said housing which is manipulated to move said mask relative to said arm and relative to said means for receiving the beam of radiation.

8. An apparatus as set forth in claim 7, further including means for fixing said mask relative to said housing.

9. An apparatus as set forth in claim 6, wherein the travel time of said displaceable member to cause interruption of the beam of radiation is related to the proximity of said mask to said inertia assembly.

10. An apparatus as set forth in claim 6, wherein said means for receiving the beam of radiation has an impingement surface larger than said aperture, said mask is movable to position said aperture adjacent to different locations on said impingement surface.

11. An apparatus as set forth in claim 3, wherein said adjustment means includes a mask member for permitting passage of only a select portion of the beam of radiation.

12. An apparatus as set forth in claim 11, wherein said adjustment means includes a means for varying a position of said mask member relative to said beam of radiation.

13. An apparatus for helping to protect a vehicle occupant, said apparatus comprising:

A spool for storing a seat belt wound on said spool, said spool being rotatable about an axis in belt withdrawal and belt retraction directions;

a ratchet wheel fixed for rotation with said spool;

movable pawl means having a blocking position for blocking said ratchet wheel and said spool against rotation in the belt withdrawal direction and a release position for permitting rotation of said ratchet wheel and said spool in the belt withdrawal direction;

activator means for moving said pawl means from its release position to its blocking position;

control means for controlling said activator means;

an inertia assembly for reacting to a vehicle inertia change, said inertia assembly including a movable ball for moving under the influence of a predetermined change in vehicle inertia, a support member having a surface for receiving said ball and for permitting movement of said ball, a displaceable member engaging said ball for movement during movement of said ball, and means for mounting said displaceable member for movement relative to said support member and said ball when said ball moves from its rest position; and a sensor assembly for detecting movement of said displaceable member and for providing a signal to said control means indicative of the movement of said displaceable member, said sensor assembly including means for directing a beam of radiation and means for receiving the beam of radiation;

said displaceable member including a portion for interrupting the beam of radiation and for causing a change in said signal provided by said sensor assembly to said control means when said ball moves from its rest position, said control means controlling said activator means in response to the change in said signal.

14. An apparatus as set forth claim 13, wherein said means for directing a beam of radiation includes a photodiode for emitting light, said means for receiving the beam of radiation includes a phototransistor, the beam of radiation being a beam of light, said portion of said displaceable member being opaque to the light.

15. An apparatus set forth in claim 14, including connection lines extending between said sensor assembly and said control means, said signal provided by said sensor assembly being an electrical signal carried by said connection lines.

16. An apparatus as set forth in claim 13, wherein said surface of said support member is shaped as a tapered recess, said tapered recess having a lowest portion at which said ball is located when said ball is in its rest position, said ball moving from its rest position upward along said tapered recess during movement of said ball.

17. An apparatus as set forth in claim 13, wherein said means for mounting said displaceable member is a pivot means for permitting said displaceable member to pivot when said ball moves from its rest position.

18. An apparatus as set forth in claim 17, wherein said support member has a slot, said displaceable member has a portion located in said slot and movable along said slot.

19. An apparatus as set forth in claim 13, wherein said displaceable member has a tapered recess in which a portion of said ball is located when said ball is in its rest position, said ball being movable relative to said displaceable member and along said tapered recess for moving said displaceable member upward as said ball moves from its rest position.

20. An apparatus as set forth in claim 13, wherein said portion of said displaceable member for interrupting the beam of radiation is a projection.

21. An apparatus as set forth in claim 13, including connection lines extending between said sensor assembly and said control means and connection lines extending between said control means and said actuator means for permitting location in a vehicle of said inertia assembly and said sensor assembly remote from a location in the vehicle of said actuator means.

22. An apparatus as set forth in claim 13, wherein said spool, said ratchet wheel and said pawl means are parts of a first vehicle occupant restraint, said apparatus including a plurality of vehicle occupant restraints, each of said vehicle occupant restraints have a respective spool, a respective ratchet wheel and a respective pawl means substantially similar to said spool, said ratchet wheel and said pawl means of said first vehicle occupant restraint, said apparatus also including a plurality of activator means, each activator means being associated with a respective one of said vehicle occupant restraints for moving said pawl means of said respective vehicle occupant restraint from its release position to its blocking position, said control means controlling all of said plurality of said activator means in response to the change in said signal caused by movement of said ball from its rest position.

23. An apparatus as set forth in claim 13, including adjustment means for adjusting a point at which said sensor assembly detects movement of said displaceable member to vary the amount of the predetermined change in vehicle inertia.

24. An apparatus for helping to protect a vehicle occupant, said apparatus comprising:

an inertia assembly for reacting to a vehicle inertia change, said inertia assembly including a movable ball for moving from a rest position under the influence of a predetermined change in vehicle inertia, a displaceable member engaging said ball, and means for mounting said displaceable member for movement relative to said ball when said ball moves from its rest position;

a sensor assembly for detecting movement of said displaceable member, said sensor assembly including means for directing a beam of radiation and means for receiving the beam of radiation, said displaceable member including a portion for interrupting the beam of radiation when said ball moves from its rest position;

a vehicle occupant restraint;

an activator means for activating said vehicle occupant restraint; and control means for controlling said activator means in response to a signal from said sensor assembly indicative of said ball rolling from its rest position.

25. An apparatus as set forth in claim 24, including connection lines extending between said sensor assembly and said control means and connection lines extending between said control means and said activator means for permitting location in a vehicle of said inertia assembly and said sensor assembly remote from a location in the vehicle of said activator means and said vehicle occupant restraint.

26. An apparatus as set forth in claim 24, wherein said means for directing a beam of radiation includes a photodiode for emitting light, and said means for receiving the beam of radiation includes a phototransistor, the beam of radiation being a beam of light.

27. An apparatus as set forth in claim 26, wherein said photodiode is spaced across a gap from said phototransistor, said portion of said displaceable member which interrupts the beam of light moves into said gap between said photodiode and said phototransistor upon movement of said displaceable member.

28. An apparatus as set forth in claim 24, wherein said displaceable member extends above said ball and is moved upward when said ball moves from its rest position.

29. An apparatus as set forth in claim 28, wherein said inertia assembly includes a support member which has a tapered recess for receiving said ball and for permitting movement of said ball, said tapered recess has a lowest portion at which said ball is located when said ball is in its rest position, said ball moving from its rest position upward along said tapered recess during movement of said ball.

30. An apparatus as set forth in claim 29, wherein said support member is shaped to permit movement of said ball in any radial direction from a center axis of said tapered recess.

31. An apparatus as set forth in claim 24, wherein said vehicle occupant restraint includes a seat belt retractor, said retractor includes a spool for storing a seat belt wound on said spool, said spool being rotatable about an axis in belt withdrawal and belt retraction directions, a ratchet wheel fixed for rotation with said spool, and movable pawl means having a blocking position for blocking said ratchet wheel and said spool against rotation in the belt withdrawal direction and a release position for permitting rotation of said ratchet wheel and said spool in the belt withdrawal direction, said activator means comprises means for moving said pawl means from its release position to its blocking position.

* * * * *